US010768836B2

(12) United States Patent
Schreter

(10) Patent No.: US 10,768,836 B2
(45) Date of Patent: Sep. 8, 2020

(54) PAGE BASED DATA PERSISTENCY

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 16/029,431

(22) Filed: Jul. 6, 2018

(65) Prior Publication Data
US 2019/0012084 A1 Jan. 10, 2019

Related U.S. Application Data

(60) Provisional application No. 62/530,075, filed on Jul. 7, 2017.

(51) Int. Cl.
| G06F 3/06 | (2006.01) |
| G06F 17/30 | (2006.01) |
| G06F 16/11 | (2019.01) |
| H04L 29/14 | (2006.01) |
| G06F 11/14 | (2006.01) |

(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *G06F 17/30088* (2013.01); *H04L 67/1097* (2013.01); *H04L 67/2809* (2013.01); *H04L 67/2842* (2013.01); *H04L 69/40* (2013.01); *G06F 2201/84* (2013.01);

(Continued)

(58) Field of Classification Search
CPC .......... G06F 3/0631; G06F 3/06; G06F 16/27; G06F 16/162; G06F 16/245; G06F 12/00; G06F 13/00
USPC ......................................... 711/100, 154, 200
See application file for complete search history.

(56) References Cited

U.S. PATENT DOCUMENTS

| 5,878,431 A | 3/1999 | Potterveld et al. |
| 7,849,223 B2 | 12/2010 | Malkhi et al. |

(Continued)

*Primary Examiner* — Tuan V Thai
(74) *Attorney, Agent, or Firm* — Mintz Levin Cohn Ferris Glovsky and Popeo, P.C.

(57) ABSTRACT

A method for page based data persistence can include storing data associated with a state machine at a computing node. The data can be stored by at least allocating a first data page for storing the data. In response to the allocation of the first data page, a first page reference to the first data page can be added to a first page list in an in-memory buffer at the computing node. When the in-memory buffer reaches maximum capacity, a second data page can be allocated for storing the first page list. A second page reference to the second data page can be added to a second page list in the in-memory buffer. Related systems and articles of manufacture, including computer program products, are also provided.

20 Claims, 5 Drawing Sheets

(51) Int. Cl.
*H04L 29/08* (2006.01)
*G06F 16/2455* (2019.01)
*G06F 12/0802* (2016.01)
*G06F 16/16* (2019.01)
*G06F 16/182* (2019.01)
*G06F 16/176* (2019.01)
*G06F 16/13* (2019.01)
*G06F 12/1009* (2016.01)
*G06F 16/951* (2019.01)
*G06F 16/27* (2019.01)
*G06F 16/23* (2019.01)
*G06F 11/16* (2006.01)
*G06F 16/245* (2019.01)
*G06F 16/215* (2019.01)

(52) U.S. Cl.
CPC .... *G06F 2201/85* (2013.01); *G06F 2212/604* (2013.01); *G06F 2212/652* (2013.01)

(56) References Cited

U.S. PATENT DOCUMENTS

| | | | |
|---|---|---|---|
| 8,760,460 B1 * | 6/2014 | Kilgariff | G06T 1/60 |
| | | | 345/543 |
| 9,087,020 B1 | 7/2015 | Amacker | |
| 10,158,642 B2 | 12/2018 | Jujjuri | |
| 10,298,640 B1 | 5/2019 | Luke | |
| 2006/0045111 A1 * | 3/2006 | Sinha | H04L 47/34 |
| | | | 370/412 |
| 2006/0271705 A1 | 11/2006 | Garcia-Luna-Aceves | |
| 2009/0150566 A1 | 6/2009 | Malkhi et al. | |
| 2009/0216936 A1 * | 8/2009 | Chu | G06F 12/0246 |
| | | | 711/103 |
| 2009/0287975 A1 | 11/2009 | Kim | |
| 2010/0002506 A1 | 1/2010 | Cho | |
| 2010/0027351 A1 | 2/2010 | Seol | |
| 2010/0293140 A1 | 11/2010 | Nishiyama | |
| 2012/0246190 A1 | 9/2012 | Surtani | |
| 2013/0080348 A1 | 3/2013 | Pantaliano | |
| 2013/0275656 A1 | 10/2013 | Talagala | |
| 2013/0275818 A1 * | 10/2013 | Okubo | G06F 11/167 |
| | | | 714/54 |
| 2014/0059290 A1 | 2/2014 | Ross | |
| 2014/0215179 A1 * | 7/2014 | Matsuhira | H04L 61/6004 |
| | | | 711/211 |
| 2014/0279920 A1 | 9/2014 | Madhavarapu | |
| 2014/0289358 A1 | 9/2014 | Lindamood et al. | |
| 2014/0304409 A1 | 10/2014 | Kamath | |
| 2015/0058291 A1 | 2/2015 | Earl | |
| 2015/0089185 A1 | 3/2015 | Brandyberry | |
| 2016/0026672 A1 | 1/2016 | Zhang | |
| 2016/0105471 A1 | 4/2016 | Nunes et al. | |
| 2016/0308968 A1 | 10/2016 | Friedman | |
| 2017/0134276 A1 | 5/2017 | White | |
| 2017/0295061 A1 | 10/2017 | Wittenschlaeger | |
| 2019/0171762 A1 | 6/2019 | Luke | |
| 2019/0205993 A1 | 7/2019 | Rodriguez | |

* cited by examiner

PAGE BASED DATA PERSISTENCY

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to data persistency and more specifically to page based data persistency for a state machine associated with a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for page based data persistency. In one aspect, there is provided a system. The system can include at least one data processor and at least one memory. The at least one memory may store instructions that result in operations when executed by the at least one data processor. The operations can include: storing data associated with a state machine at a computing node, the data being stored by at least allocating a first data page for storing at least a portion of the data associated with the state machine; in response to the allocation of the first data page, adding, to a first page list in an in-memory buffer at the computing node, a first page reference to the first data page; and in response to the in-memory buffer reaching maximum capacity: allocating a second data page for storing the first page list; and adding, to a second page list in the in-memory buffer, a second page reference to the second data page.

In some variations, one or more features disclosed herein including the following features can optionally be included in any feasible combination. A reference count associated with the first data page can be incremented based at least on the first data page being referenced by the first page list. The reference count associated with the first data page can be decremented in response to the first page list becoming obsolete. In response to the reference count associated with the first data page being zero, the first data page can be deallocated to enable the first data page to be reused for storing additional data associated with the state machine.

In some variations, the in-memory buffer can be stored in an in-memory data store at the computing node. The first data page and/or the second data page can be stored in a secondary data store at the computing node.

In some variations, at least the portion of the data associated with the state machine can be retrieved by recursively traversing the first page list and the second page list. The recursive traversal of the first page list and/or the second page list can include: retrieving, from the second page list, the second page reference to the second data page; determining that the second page reference comprises an indirect page reference to the first data page based at least on the second data page storing the first page list; and in response to the second page reference being the indirect page reference to the first data page, retrieving the first data page to traverse the first page list stored in the first data page. The first page reference to the first data page can be retrieved from the first page list. The first page reference can be determined to be a direct page reference based at least on the first data page storing at least a portion of the data associated with the state machine. In response to the first page reference being the direct page reference, the first data page can be retrieved in order to retrieve at least the portion of the data associated with the state machine stored in the first data page.

In some variations, the first page list and the second page list can be merged by at least adding the page references included in the second page list to the first page list. In response to a portion of the first page list being stored in a third data page subsequent to the merge, a third page reference to the third data page storing the portion of the first page list can be added to the first page list.

In some variations, the addition of the first page reference and/or the second page reference to the memory buffer can enable the first data page and/or the second data page to be stored without a header.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
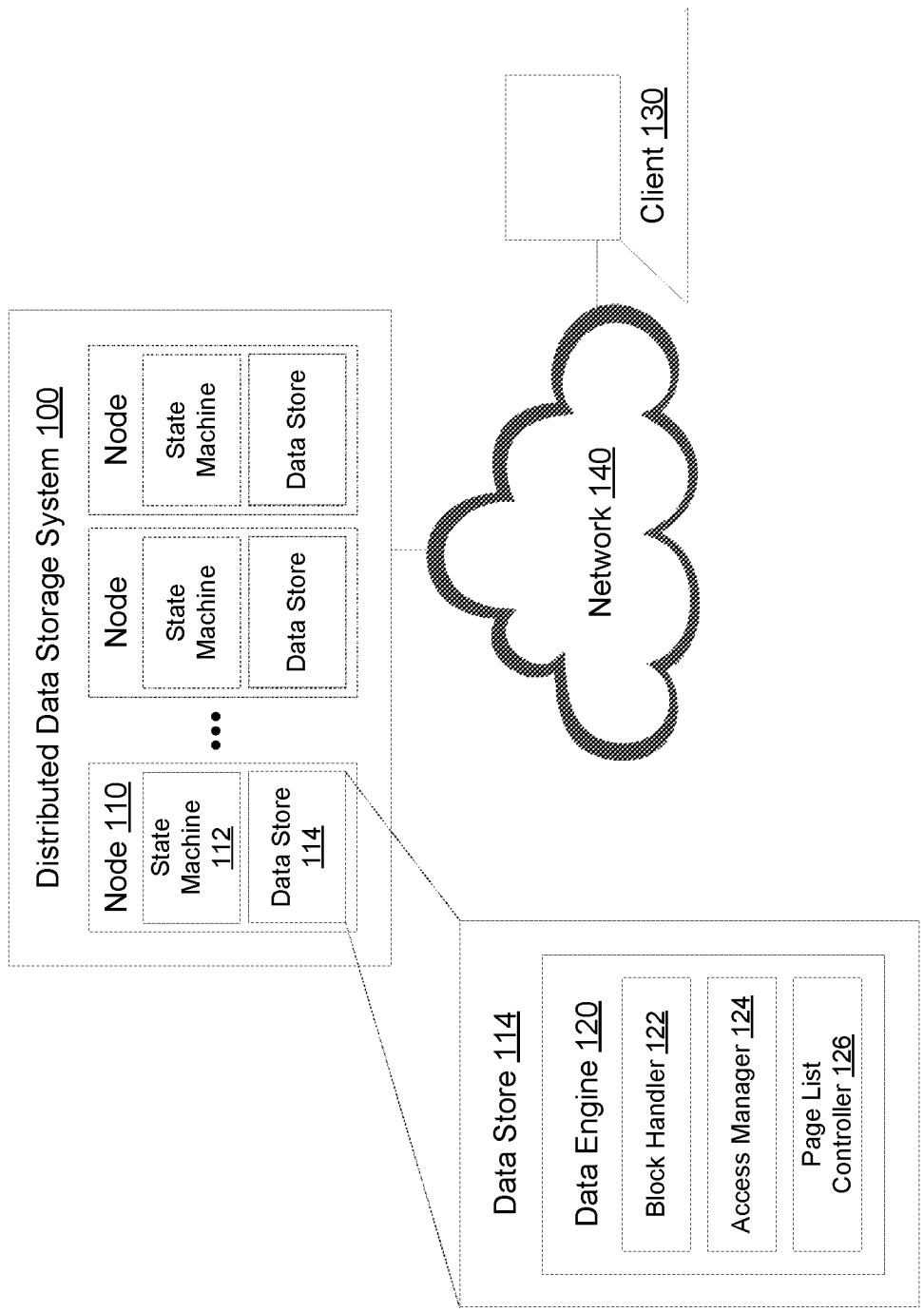
FIG. 1 depicts a system diagram illustrating a distributed data storage system consistent with some implementations of the current subject matter.

A distributed data storage system can include a plurality of computing nodes, each of which storing data in fixed and/or variable sized blocks of memory such as, for example, data pages and/or the like. Furthermore, each computing node in the distributed data storage system can be associated with a state machine configured to track the changes to the data stored at the computing node. For instance, applying a change to the data stored at a computing node can trigger a corresponding state transition at the state machine associated with the computing node. A file system can provide an interface for accessing the data stored at the computing nodes in the distributed data storage system, for example, by organizing this data into a hierarchy of files and/or folders containing one or more files. However, the file system can be inadequate for handling the data associated with the state machines at each of the plurality of computing nodes within the distributed data storage system. As such, in some implementations of the current subject matter, the distributed data storage system can provide page based data persistency for handling the data associated with these state machines.

In some implementations of the current subject matter, data associated with the state machine associated with a computing node can associated with one or more page lists. Each page list can be an ordered collection of direct page references and/or indirect page references to data pages at the computing node that have been allocated to store data associated with the state machine. For example, a new page reference can be added to a page list whenever a new data page at the computing node is allocated for storing data associated with the state machine at the computing node. This new page reference can be a direct page reference to a corresponding data page at the computing node that stores data associated with the state machine. Alternatively and/or additionally, this new page reference can be an indirect page reference to another page list, which can be another collection of direct page references and/or indirect page references to data pages at the computing node.

In some implementations of the current subject matter, the computing node can include both an in-memory data store and a secondary data store. The in-memory data store can store an in-memory buffer while the secondary data store can store the one or more data pages holding data associated with the state machine at the computing node. Allocating new data pages within the secondary data store, for example, to store data associated with the state machine at the computing node can include adding, to a page list in the in-memory buffer, corresponding direct page references to these data pages. When the in-memory buffer reaches maximum capacity, this page list can be written to a data page in the secondary data store while an indirect page reference to this page list can be added to a new page list in the in-memory buffer.

In some implementations of the current subject matter, a data page can be added to and/or released from a page list, which can result in updating a corresponding reference count. For instance, the reference count associated with the data page can be incremented when the data page is allocated and/or when a page reference to the data page is added to one or more page lists. Alternatively and/or additionally, the reference count associated with the data page can be decremented in response to a page list containing a page reference to the data page becoming obsolete. It should be appreciated that the data page can become a free data page when the reference count associated with the data page reaches zero. Furthermore, if the data page stores a page list that includes page references to one or more other data pages, the reference count of the other data pages indirectly referenced by the data page can also be decremented when the reference count of the data page reaches zero.

FIG. 1 depicts a system diagram illustrating a distributed data storage system 100 consistent with implementations of the current subject matter. Referring to FIG. 1, the distributed data storage system 100 can include a plurality of computing nodes, each of which including a data store. Furthermore, each of the plurality of computing nodes can be associated with a state machine configured to track, via state transitions, one or more changes to the data in the corresponding data store. For example, the distributed data storage system 100 can include a computing node 110 that includes a data store 114. The computing node 110 can be associated with a state machine 112 configured to track, via state transitions, one or more changes to the data in the data store 114.

As shown in FIG. 1, the distributed data storage system 100 can be communicatively coupled, via a network 140, with one or more clients including, for example, a client 130. The network 140 can be any wired and/or wireless network including, for example, a public land mobile network (PLMN), a local area network (LAN), a virtual local area network (VLAN), a wide area network (WAN), the Internet, and/or the like. Meanwhile, the client 130 can be any processor-based device including, for example, a mobile device, a wearable device, a tablet computer, a desktop computer, a laptop computer, and/or the like. It should be appreciated that the changes to the data stored at the computing node 110, for example, in the data store 114, can be triggered by one or more queries from the client 130. For instance, the client 130 can send, via the network 140, one or more queries to the distributed data storage system 100 that adds, removes, and/or updates data from data store 114 at the computing node 110. These changes to the data in the data store 114 can trigger one or more state transitions at the state machine 112.

In some implementations of the current subject matter, the data store 114 can be a key-value store configured to store data in the form of one or more key-value pairs (KVPs). For instance, the data store 114 can be a hybrid key-value store in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like.

Referring again to FIG. 1, the distributed data storage system 100, for example, the computing node 110, can be coupled with a data engine 120. For example, as shown in FIG. 1, the data engine 120 can be part of the data store 114. In some implementations of the current subject matter, the data engine 120 can be configured to handle data associated with the state machines at the plurality of computing nodes included in the distributed data storage system 100. For example, the data engine 120 can handle data associated with the state machine 112 associated with the computing node 110. This data can include one or more snapshots of the state machine 112 representative of a state of the computing node 110, for example, the data in the data store 114, at various checkpoints. Furthermore, these snapshots of the state machine 112 can be stored at in the data store 114, for example, in one or more fixed size and/or variable size data pages.

According to some implementations of the current subject matter, the data engine 120 can include a block handler 122, an access manager 124, and a page list controller 126. The block handler 122 can be configured to support the allocation of one or more data pages in the data store 114, for example, to store data associated with the state machine 112. Furthermore, the block handler 122 can be configured to manage the reference count associated with the one or more data pages in the data store 114. For instance, the block handler 112 can increment and/or decrement the reference count associated with the one or more data pages in the data store 114. Meanwhile, the access manager 124 can be configured to provide access to the data pages stored in the data store 114. For example, the access manager 124 can support read operations and/or write operations accessing one or more data pages in the data store 114. It should be appreciated that a write operation can be performed, for example, at a checkpoint, in order to write at least a portion of a snapshot of the state machine 112 to one or more data pages, thereby preserving the state of the computing node 110 at that particular point in time. Alternatively and/or additionally, a read operation can be performed in order to read at least a portion of the snapshot of the state machine 112 from the one or more data pages. The snapshot of the state machine 112 read from the one or more data pages can be used to restore the data stored at the computing node 110, for example, in the data store 114, to the state at the checkpoint.

As noted, data associated with the state machine 112 can be stored at the data store 114. For instance, the block handler 122 can allocate a data page at the data store 114 for storing data associated with the state machine 112. In response to the allocation of the data page, the page list controller 126 can add, to an existing page list and/or a new page list, a page reference to the data page allocated for storing the data associated with the state machine 112. It should be appreciated that the page list can be an ordered collection of direct page references and/or indirect page references to the data pages at the data store 114 that have been allocated for storing the data associated with the state machine 112.

Figure 2:
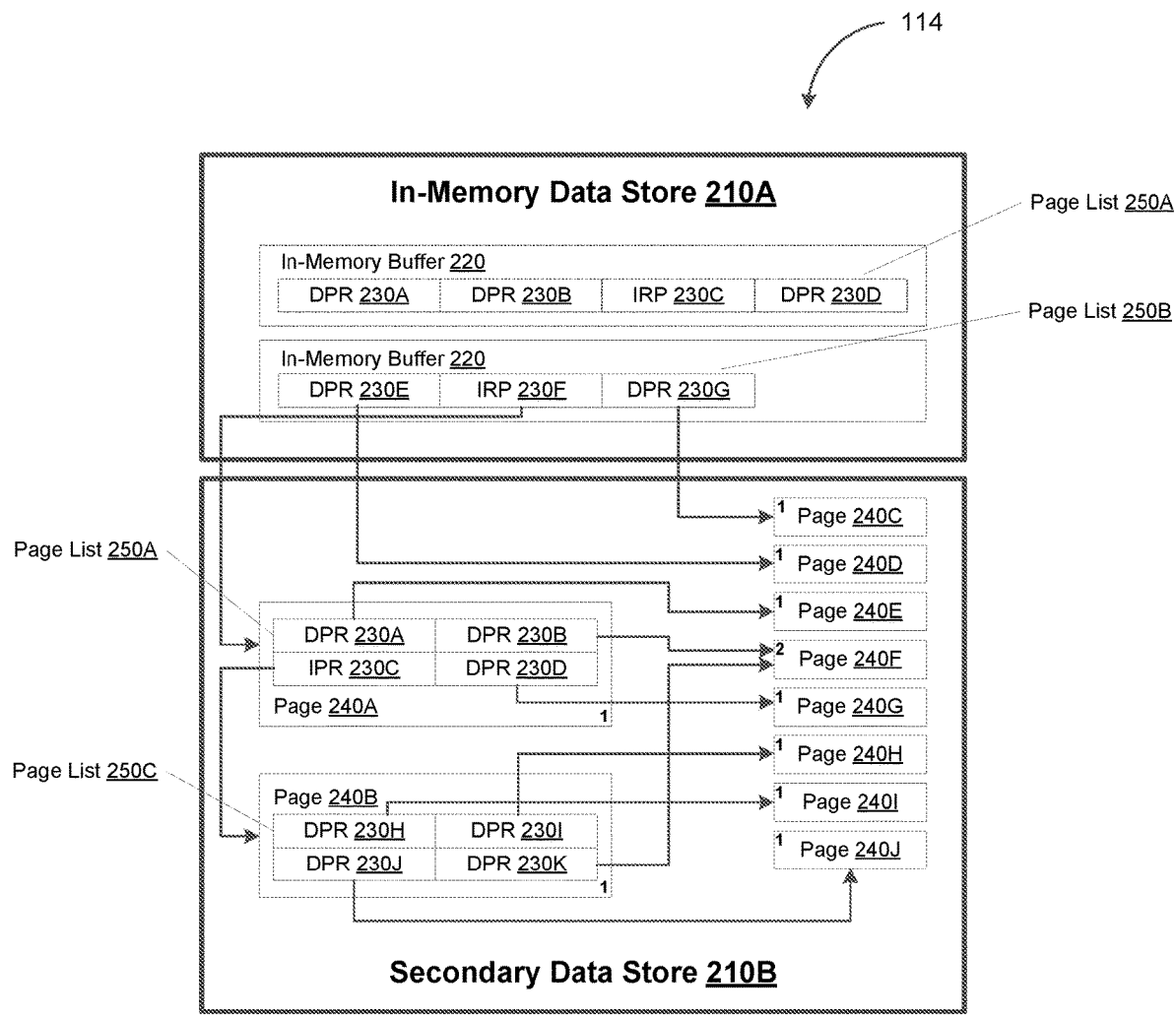
FIG. 2 depicts page based data persistency consistent with implementations of the current subject matter.

To further illustrate, FIG. 2 depicts page based data persistency consistent with some implementations of the current subject matter. Referring to FIGS. 1-2, it should be appreciated that the data store 114 can include an in-memory data store 210A and a secondary data store 210B. As shown in FIG. 2, the in-memory data store 210A can store an in-memory buffer 220. Meanwhile, the secondary data store 210B can store data in a plurality of data pages including, for example, a first data page 240A, a second data page 240B, a third data page 240C, a fourth data page 240D, a fifth data page 240E, a sixth data page 240F, a seventh data page 240G, an eighth data page 240H, a ninth data page 240I, and/or a tenth data page 240J.

Referring again to FIG. 2, the data store 114 can further store, in the in-memory data store 210A and/or the secondary data store 210B, direct page references and/or indirect page references to these data pages including, for example, a first page reference 230A, a second page reference 230B, a third page reference 230C, a fourth page reference 230D, a fifth page reference 230E, a sixth page reference 230F, a seventh page reference 230G, an eighth page reference 230H, a ninth page reference 230I, a tenth page reference 230J, and/or an eleventh page reference 230K. It should be appreciated that a page reference to a data page can include a physical reference to a corresponding data page (e.g., an offset at the secondary data store 210B), a page size, a page type (e.g., a direct data page storing data associated with the state machine 112 or an indirect data page storing a page list), a checksum generated based on at least a portion of the contents of the data page, and/or any additional information. The page reference to a data page can obviate storing the data page, for example, in the secondary data store 210B, with a header.

According to some implementations of the current subject matter, a page list can be stored, at least temporarily, in the in-memory buffer 220 prior to be written to one of the plurality of data pages in the secondary data store 210B. For example, referring again to FIGS. 1-2, the fifth data page 240E can be allocated for example, by the block handler 122, to store data associated with the state machine 112 including, for example, at least a portion of a snapshot of the state machine 112. In response to the allocation of the fifth data page 240E, the page list controller 126 can store, to the in-memory buffer 220, the first page reference 230A referencing the fifth data page 240E. As FIG. 2 shows, the first page reference 230A can be a direct page reference (DPR) to the fifth data page 240E containing data associated with the state machine 112. Furthermore, the first page reference 230A can include a checksum generated based on at least a portion of the contents of the fifth data page 240E. However, it should be appreciated that indirect page references (IPR), for example, the third page reference 230C, can also be added to the in-memory buffer 220. These direct page references and/or indirect page references can form a first page list 250A which, as noted, can be a collection of direct page references and/or indirect page references to data pages at the computing node 110, for example, in the secondary data store 210B.

In some implementations of the current subject matter, additional direct page references and/or indirect page references can be added to the first page list 250A in the in-memory buffer 220 until the in-memory buffer 220 reaches maximum capacity. Upon the in-memory buffer 220 reaching maximum capacity, the page list controller 126 can write the first page list 250A out to the secondary data store 210B, for example, to the first data page 240A. Furthermore, the page list controller 126 can start, in the in-memory buffer 220, a new page list such as, for example, a second page list 250B. The page list controller 126 can include, as part of the second page list 250B in the in-memory buffer 220, the sixth page reference 230F to the first data page 240A. This sixth page reference 230F can be an indirect page reference because the sixth page reference 230F references a data page containing another page list instead of a data page containing data associated with the state machine 112. Moreover, the sixth page reference 230F can include a checksum corresponding to at least a portion of the contents of the first data page 240A.

As noted, in some implementations of the current subject matter, each data page in the secondary data store 210B can be associated with a reference count. The reference count associated with a data page can be incremented, for example, by the block manager 112, based at least on the data page being referenced by a direct page reference and/or an indirect page reference included in a page list. For instance, the block manager 112 can increment the reference count associated with the first data page 240A in response to the first data page 240A being referenced by the sixth page reference 230F included in the second page list 250B. As FIG. 2 shows, the first data page 240A can be associated with a reference count of "1," which corresponds to the first data page 240A being referenced once by the sixth page reference 230F in the second page list 250B. Alternatively and/or additionally, the block manager 112 can increment the reference count associated with the sixth data page 240F based at least on the sixth data page 240F being referenced by the second page reference 230B included in the first page list 250A and/or the eleventh page reference 230K included in a third page list 250C. The reference count of "2" associated with the sixth data page 240F can reflect the sixth data page 240 being referenced by the second page reference 230B included in the first page list 250A and the eleventh page reference 230K included in the third page list 250C.

In some implementations of the current subject matter, the block manager 112 can also decrement the reference count associated with a data page based at least on a page list containing a page reference to the data page becoming obsolete. For example, the block manager 112 can decrement the reference count associated with the first data page 240A if the second page list 250B becomes obsolete. As the second page list 250B includes indirect page reference to the first page list 250A, the block manager 112 can further transitively decrement the reference count of the data pages referenced by the first page list 250A in the event the second page list 250B becomes obsolete. For instance, in addition to decrementing the reference count associated with the first data page 240A when the second page list 250B becomes obsolete, the block manager 112 can further decrement the respective reference counts of the second data page 240B, the fifth data page 240E, the sixth data page 240F, and the seventh data page 240G referenced by the first page list 250A. It should be appreciated that a data page can become a free data page when the reference count associated with the data page reaches zero. Accordingly, the block manager 112 can allocate the data page, for example, to store other data associated with the state machine 110, if the reference count associated with the data page is zero.

In some implementations of the current subject matter, a page list can become obsolete when the pages referenced in the page list are pinned by one or more other page lists. For example, the page list can be obsolete when that page list is aggregated into another page list such as, for example, the page list for a log segment, the page list for a key-value store data block, and/or the like. The page list of an old log segment associated with an old snapshot of the state machine 112 can also become obsolete. It should be appreciated that a log segment associated with the old snapshot of the state machine 112 becomes superfluous once a new snapshot of the state machine 112 is written.

According to some implementations of the current subject matter, retrieving data associated with the state machine 112 can include traversing the corresponding page lists to at least identify the data pages storing the data associated with the state machine 112. For example, a snapshot of the state machine 112 can be retrieved by at least traversing a page list (e.g., the first page list 250A, the second page list 250B, or the third page list 250C) and identifying, based at least on the direct page references and/or indirect page references included in the page list, the data pages in the secondary data store 210B storing the snapshot of the state machine 112. It should be appreciated that the traversal of the first page list 250A, the second page list 250B, and/or the third page list 250C can start at a root page list generated and stored during a checkpoint. Moreover, due to the presence of indirect page references, the traversal of page lists can be recursive. For instance, traversing the second page list 250B can include recursively traversing the first page list 250A, upon encountering the sixth page reference 230F indirectly referencing the first data page 240A containing the first page list 230C. Moreover, upon encountering the third page reference 230C indirectly referencing the second data page 240B containing the third page list 250C, the traversal of the second page list 250B can further include traversing the third page list 250C.

In some implementations of the current subject matter, the page list controller 126 can support a merging of two or more page lists. For example, the page list controller 126 can merge the first page list 250A and the second page list 250B by at least adding, to the first page list 250A, page references included in the second page list 250B. Adding page references from the second page list 250B into the first page list 250A can result in the first page list 250A exceeding the capacity of a single data page within the secondary data store 210B. As such, merging the first page list 250A and the second page list 250B can include can include adding, to the first page list 250A, at least one indirect page reference to additional data pages that have been allocated, for example, by the block handler 122, for storing the page references being added to the first page list 250A from the second page list 250B.

It should be appreciated that the first page list 250A and the second page list 250B can be merged with or without destroying the second page list 250B. For instance, to merge the first page list 250A with the second page list 250B while keeping the second page list 250B intact, the page list controller 126 can increment the reference count of the data pages referenced by the portion of the second page list 250B still being held in the in-memory buffer 220. Alternatively and/or additionally, the page list controller 126 can omit incrementing any reference counts on pages from second page list 250B if the first page list 250A and the second page list 250B are merged without keeping the second page list 250B intact.

It should be appreciated that a snapshot capturing the state of the computing node 110, for example, the data stored in the data store 114, at a particular checkpoint can be stored in data pages referenced by multiple page lists. As such, in some implementations of the current subject matter, these page lists can be merged into a single page list such that the snapshot of the state machine 112 can be referenced by a single page list, for example, a root page list of the state machine 112, instead of multiple page lists.

Figure 3:
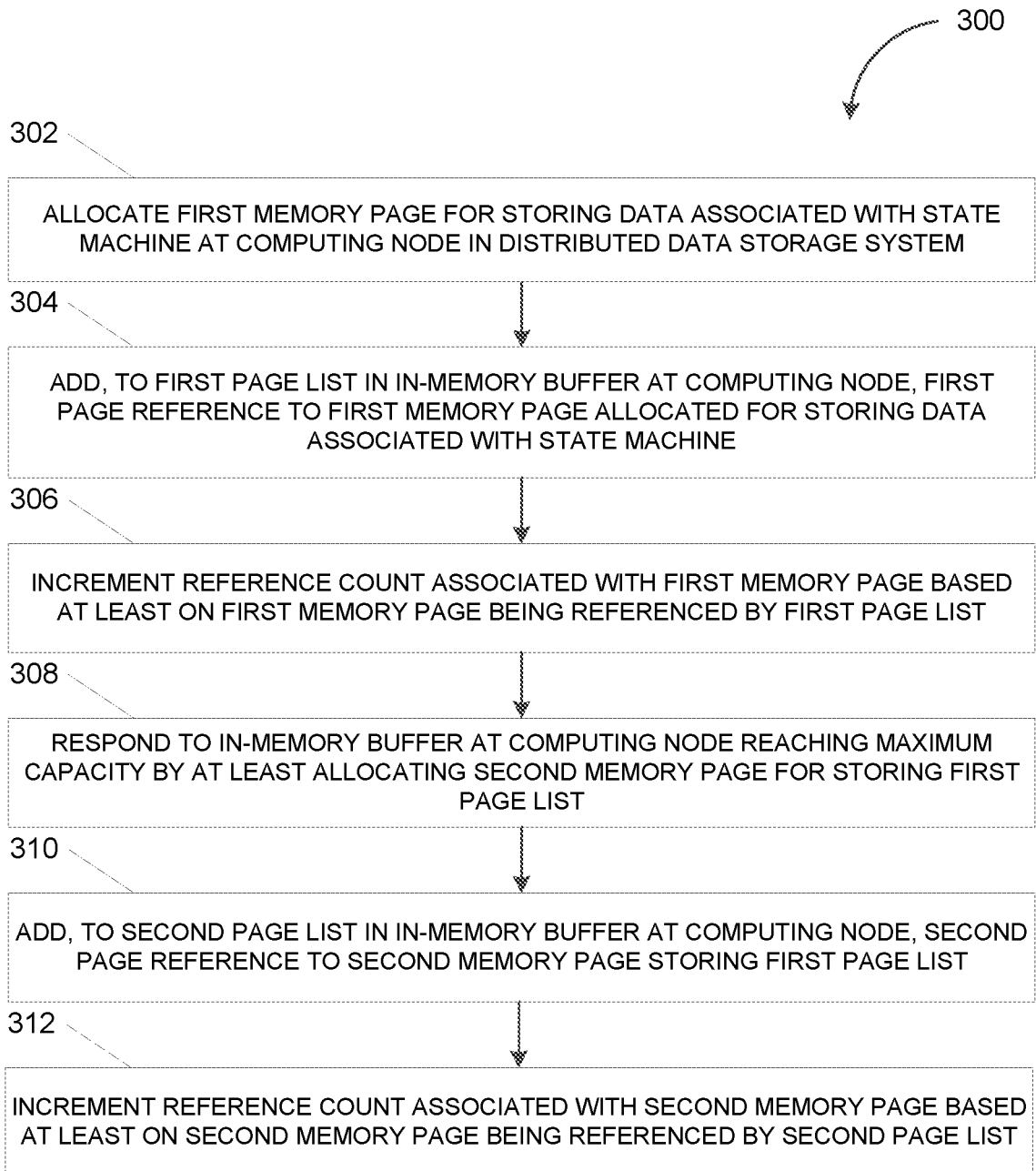
FIG. 3 depicts a flowchart illustrating a process for persisting data associated with a state machine representative of a computing node within a distributed data storage system consistent with implementations of the current subject matter.

FIG. 3 depicts a flowchart illustrating a process 300 for persisting data associated with a state machine representative of a computing node within the distributed data storage system 100 consistent with implementations of the current subject matter. Referring to FIGS. 1-3, the process 300 can be performed by the data engine 120 in order to store data associated with the state machine 112 at the computing node 110 in the distributed data storage system 100. However, it should be appreciated that the process 300 can be performed to store data associated with any state machine at any computing node within the distributed data storage system 100.

The data engine 120 can allocate a first data page for storing data associated with the state machine 112 at the computing node 110 in the distributed data storage system 100 (302). For example, the block handler 122 at the data engine 120 can allocate the fifth data page 240E for storing data associated with the state machine 112. As noted, data associated with the state machine 112 can include a snapshot of the state machine 112 capturing a state of the computing node 110 at a certain checkpoint.

The data engine 120 can add, to a first page list in an in-memory buffer at the computing node 110, a first page reference to the first data page allocated for storing data associated with the state machine 112 (304). In some implementations of the current subject matter, the page list controller 126 at the data engine 120 can respond to the allocation of the fifth data page 240E at least by adding, to the first page list 250A, the first page reference 230A to the fifth data page 240E. The first page list 250A can be held in the in-memory buffer 220, which can be stored in the in-memory data store 210A at the data store 140. Meanwhile, the fifth data page 240E can be held in the secondary data store 210B. As FIG. 2 shows, the first page reference 230A can be a direct page reference to the fifth data page 240E because the fifth data page 240E stores data associated with the state machine 112 instead of another page list.

The data engine 120 can increment a reference count associated with the first data page based at least on the first data page being referenced by the first page list (306). In some implementations of the current subject matter, the block handler 122 at the data engine 120 can increment the reference count associated with the fifth data page 240E to indicate that the fifth data page 240E is being referenced by the first page list 250A. This reference count can be decremented if the first page list 250A becomes obsolete. Moreover, once the reference count associated with the fifth data page 240E reaches zero, the fifth data page 240E can become a free data page that can be allocated for storing, for example, other data associated with the state machine 112.

The data engine 120 can respond to the in-memory buffer at the computing node 110 reaching maximum capacity by at least allocating a second data page for storing the first page list (308). The data engine 120 can add, to a second page list in the in-memory buffer at the computing node 110, a second page reference to the second data page storing the first page list (310). For example, once the in-memory buffer 220 reaches maximum capacity, the page list controller 126 at the data engine 120 can write the first page list 250A to the first data page 240A in the secondary data store 210B. Furthermore, the page list controller 126 can start, as a new page list, the second page list 260B and add, to the second page list 260B, the sixth page reference 230F to the first data page 240A containing the first page list 250A. This sixth page reference 230A can be an indirect page reference because the sixth page reference 230A references a data page containing another page list instead of a data page containing data associated with the state machine 112.

The data engine 120 can increment a reference count associated with the second data page based at least on the second data page being referenced by the second page list (312). In some implementations of the current subject matter, the block handler 122 at the data engine 120 can increment the reference count associated with the first data page 240A to indicate that the first data page 240A is referenced by the second page list 250B. As noted, this reference count also can be decremented if the second page list 250B becomes obsolete. Furthermore, once the reference count associated with the first data page 240A reaches zero, the first data page 240A can become a free data page that can be allocated by the block handler 122 for storing, for example, other data associated with the state machine 112.

Figure 4:
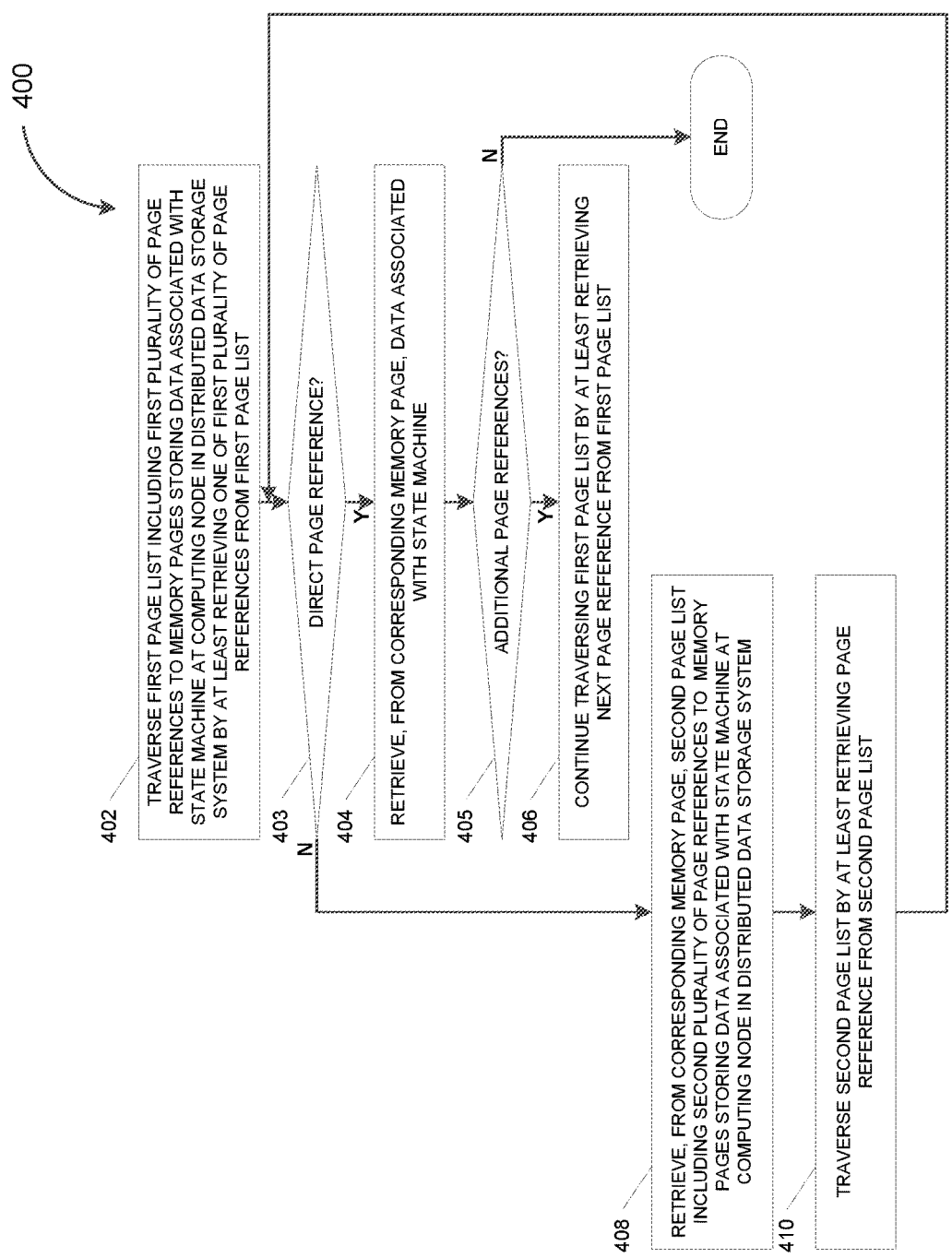
FIG. 4 depicts a flowchart illustrating a process for retrieving data associated with a state machine representative of a computing node within a distributed data storage system consistent with some implementations of the current subject matter.

FIG. 4 depicts a flowchart illustrating a process 400 for retrieving data associated with a state machine representative of a computing node within a distributed data storage system 100 consistent with some implementations of the current subject matter. Referring to FIGS. 1-2 and 4, the process 400 can be performed by the data engine 120 in order to retrieve data associated with the state machine 112 at the computing node 110 at the distributed data storage system 100. However, it should be appreciated that the process 400 can be performed to retrieve data associated with any state machine at any computing node within the distributed data storage system 100. As noted, in some implementations of the current subject matter, retrieving data associated with the state machine 112 can include recursively traversing one or more page lists that includes direct page references and/or indirect page references to data pages storing data associated with the state machine 112.

The data engine 120 can traverse a first page list including a first plurality of page references to data pages storing data associated with the state machine 112 at the computing node 110 in the distributed data storage system 100 by at least retrieving one of the first plurality of page references from the first page list (402). In some implementations of the current subject matter, the data engine 120 can retrieve data associated with the state machine 112 including, for example, data corresponding to a snapshot of the state machine 112 representative of a state the computing node 110, for example, the data stored in the data store 114, at a particular checkpoint. The data engine 120 can retrieve this data by at least traversing one or more page lists that includes direct page references and/or indirect page references to data pages in the secondary data store 210B. According to some implementations of the current subject matter, the data engine 120 can traverse these page lists recursively, starting from a root page list. For example, the data engine 120 can traverse the first page list 250A by at least retrieving, from the first page list 250A, the first page reference 230A.

The data engine 120 can determine whether the page reference is a direct page reference to a data page storing data associated with the state machine 112 (403). For example, the data engine 120 can determine whether the first page reference 230A is a direct page reference to a data page storing data associated with the state machine 112 and/or an indirect page reference to data page storing another page list.

If the data engine 120 determines that the first page reference included in the first page list is a direct page reference to a data page storing data associated with the state machine 112 (403-Y), the data engine 120 can retrieve, from a corresponding data page, data associated with the state machine 112 (404). For example, the first page reference 230A can be a direct reference to the fifth data page 240E storing data associated with the state machine 112. As such, the data engine 120 can retrieve, from the fifth data page 240E, data associated with the state machine 112. This data can include at least a portion of the snapshot of the state machine 112.

Upon retrieving the data page storing data associated with the state machine 112 at operation 404, the process 400 can continue at operation 405, in which the data engine 120 determines whether the first page list includes any additional page references. If the data engine 120 determines that the first page list does not include any additional page references (405-N), the process 400 can terminate. Otherwise, if the data engine 120 determines that the first page list does include additional page references (405-Y), the data engine 120 can continue traversing the first page list by at least retrieving a next page reference from the first page list (406). For example, the data engine 120 can retrieve, from the first page list 250A, the second page reference 230B. Furthermore, the process 400 can continue at operation 403 where the data engine 120 determines whether the page reference is a direct page reference to a data page storing data associated with the state machine 112. For instance, the data engine 120 can continue the process 400 by at least determining whether the second page reference 230B is a direct page reference or an indirect page reference.

Alternatively and/or additionally, if the data engine 120 determines that the first page reference included in the first page list is not a direct page reference (403-N), the data engine 120 can retrieve, from a corresponding data page, a second page list including a second plurality of page references to data pages storing data associated with the state machine 112 at the computing node 110 in the distributed data storage system 100 (408). For example, when the data engine 120 retrieves the third page reference 230C from the first page list 250A, the data engine 120 can determine that the third page reference 230C is an indirect page reference to the second data page 240B, which contains the third page list 250C.

The data engine 120 can traverse the second page list recursively by at least retrieving a page reference from the second page list (410). For example, the data engine 120 can traverse the third page list 250C by at least retrieving, from the third page list 250C, the eighth page reference 230H. Here, the process 400 can continue at operation 403 where the data engine 120 determines whether the page reference is a direct page reference to a data page storing data associated with the state machine 112. For instance, the data engine 120 can determine whether the eighth page reference 230H is a direct page reference or an indirect page reference. As noted, if the eighth page reference 230H is a direct page reference (as shown in FIG. 2), the data engine 120 can retrieve, from the ninth data page 240I referenced by the eighth page reference 230H, data associated with the state machine 112, which can correspond to at least a portion of the snapshot of the state machine 112. Alternatively and/or additionally, if the eighth page reference 230H is an indirect page reference, the data engine 120 can continue process 400 by at least recursively traversing the page list that stored in the data page indirectly referenced by the eighth page reference 230H.

Figure 5:
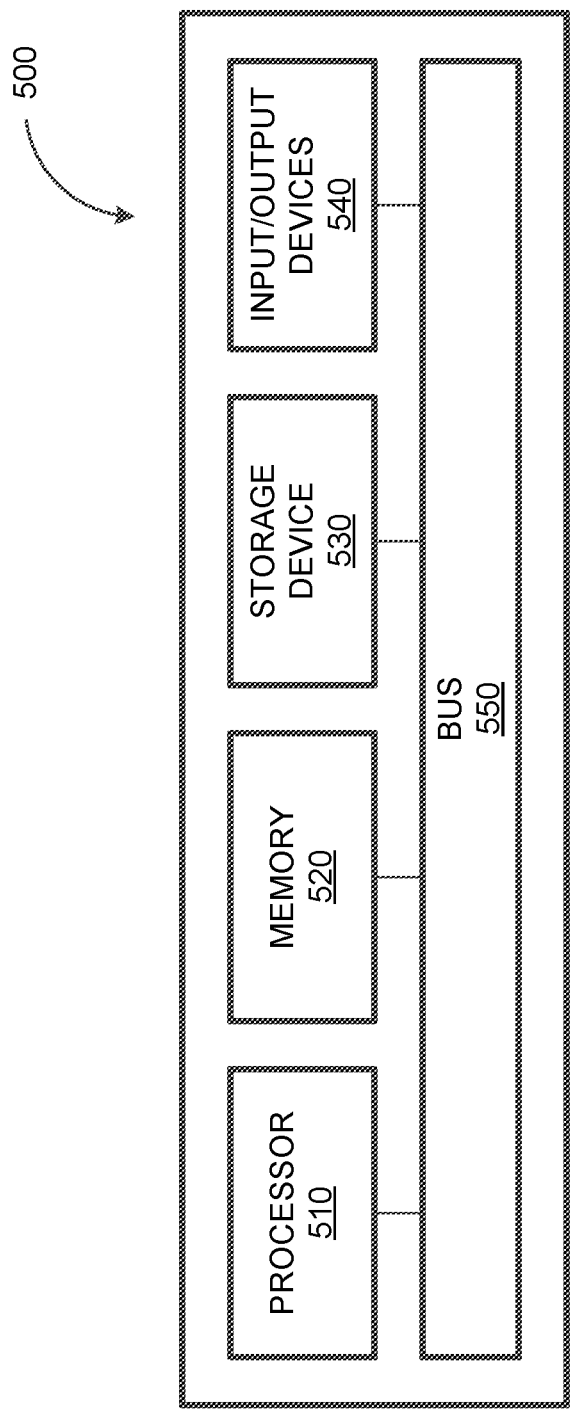
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed data storage system 100, for example, the data engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   storing data associated with a state machine at a computing node, the data being stored by at least allocating a first data page for storing at least a portion of the data associated with the state machine, the data associated with the state machine including one or more snapshots of data at the computing node, and the one or more snapshots being generated at one or more corresponding checkpoints;
   in response to the allocation of the first data page, adding, to a first page list in an in-memory buffer at the computing node, a first page reference to the first data page; and
   in response to the in-memory buffer reaching a maximum capacity due to the first page reference being added to the first page list,
   allocating, in a secondary data store at the computing node, a second data page for storing the first page list, and
   adding, to a second page list in the in-memory buffer, a second page reference to the second data page in the secondary data store.

2. The system of claim 1, further comprising:
incrementing a reference count associated with the first data page based at least on the first data page being referenced by the first page list.

3. The system of claim 2, further comprising:
in response to the first page list becoming obsolete, decrementing the reference count associated with the first data page.

4. The system of claim 3, further comprising:
in response to the reference count associated with the first data page being zero, deallocating the first data page to enable the first data page to be reused for storing additional data associated with the state machine.

5. The system of claim 1, wherein the in-memory buffer is stored in an in-memory data store comprising the computing node, and wherein the first data page is stored in the secondary data store at the computing node.

6. The system of claim 1, further comprising:
retrieving at least the portion of the data associated with the state machine by recursively traversing the first page list and the second page list.

7. The system of claim 6, wherein the recursive traversal of the first page list and/or the second page list comprises:
retrieving, from the second page list, the second page reference to the second data page;
determining that the second page reference comprises an indirect page reference to the first data page based at least on the second data page storing the first page list; and
in response to the second page reference being the indirect page reference to the first data page, retrieving the first data page to traverse the first page list stored in the first data page.

8. The system of claim 7, further comprising:
retrieving, from the first page list, the first page reference to the first data page;
determining that the first page reference comprises a direct page reference based at least on the first data page storing at least a portion of the data associated with the state machine; and
in response to the first page reference being the direct page reference, retrieving the first data page to retrieve at least the portion of the data associated with the state machine stored in the first data page.

9. The system of claim 1, further comprising:
merging the first page list and the second page list by at least adding the page references included in the second page list to the first page list; and
in response to a portion of the first page list being stored in a third data page subsequent to the merge, adding, to the first page list, a third page reference to the third data page storing the portion of the first page list.

10. The system of claim 1, wherein the addition of the first page reference and/or the second page reference to the memory buffer enables the first data page and/or the second data page to be stored without a header.

11. A method, comprising:
storing data associated with a state machine at a computing node, the data being stored by at least allocating a first data page for storing at least a portion of the data associated with the state machine, the data associated with the state machine including one or more snapshots of data at the computing node, and the one or more snapshots being generated at one or more corresponding checkpoints;
in response to the allocation of the first data page, adding, to a first page list in an in-memory buffer at the computing node, a first page reference to the first data page; and
in response to the in-memory buffer reaching a maximum capacity due to the first page reference being added to the first page list,
allocating, in a secondary data store at the computing node, a second data page for storing the first page list, and
adding, to a second page list in the in-memory buffer, a second page reference to the second data page in the secondary data store.

12. The method of claim 11, further comprising:
incrementing a reference count associated with the first data page based at least on the first data page being referenced by the first page list.

13. The method of claim 12, further comprising:
in response to the first page list becoming obsolete, decrementing the reference count associated with the first data page.

14. The method of claim 13, further comprising:
in response to the reference count associated with the first data page being zero, deallocating the first data page to enable the first data page to be reused for storing additional data associated with the state machine.

15. The method of claim 11, wherein the in-memory buffer is stored in an in-memory data store comprising the computing node, and wherein the first data page is stored in the secondary data store at the computing node.

16. The method of claim 11, further comprising:
retrieving at least the portion of the data associated with the state machine by recursively traversing the first page list and the second page list.

17. The method of claim 16, wherein the recursive traversal of the first page list and/or the second page list comprises:
retrieving, from the second page list, the second page reference to the second data page;
determining that the second page reference comprises an indirect page reference to the first data page based at least on the second data page storing the first page list; and
in response to the second page reference being the indirect page reference to the first data page, retrieving the first data page to traverse the first page list stored in the first data page.

18. The method of claim 17, further comprising: retrieving, from the first page list, the first page reference to the first data page; determining that the first page reference comprises a direct page reference based at least on the first data page storing at least a portion of the data associated with the state machine; and in response to the first page reference being the direct page reference, retrieving the first data page to retrieve at least the portion of the data associated with the state machine stored in the first data page.

19. The method of claim 11, wherein the addition of the first page reference and/or the second page reference to the memory buffer enables the first data page and/or the second data page to be stored without a header.

20. A non-transitory computer-readable medium storing instructions, which when executed by at least one data processor, result in operations comprising:
storing data associated with a state machine at a computing node, the data being stored by at least allocating a first data page for storing at least a portion of the data associated with the state machine, the data associated with the state machine including one or more snapshots of data at the computing node, and the one or more snapshots being generated at one or more corresponding checkpoints;

in response to the allocation of the first data page, adding, to a first page list in an in-memory buffer at the computing node, a first page reference to the first data page; and in response to the in-memory buffer reaching a maximum capacity due to the first page reference being added to the first page list,
- allocating, in a secondary data store at the computing node, a second data page for storing the first page list, and
- adding, to a second page list in the in-memory buffer, a second page reference to the second data page in the secondary data store.

* * * * *